United States Patent [19]
Coleman

[11] Patent Number: 5,938,405
[45] Date of Patent: Aug. 17, 1999

[54] QUICK RELEASE ENGINE COOLING FAN SHAFT

[75] Inventor: Gene Coleman, Menomonee, Mich.

[73] Assignee: Coleman Machine, Inc., Menomonee, Mich.

[21] Appl. No.: 09/036,167

[22] Filed: Mar. 6, 1998

[51] Int. Cl.[6] .................................................. F01D 25/08
[52] U.S. Cl. ............................. 416/170 R; 416/169 A; 416/204 R; 416/244 R
[58] Field of Search ........................ 416/169 A, 204 R, 416/244 R, 170 R; 403/344, 359, 383, 379.3, 378, 325, 324, 326, 327

[56] References Cited

U.S. PATENT DOCUMENTS

| | | | |
|---|---|---|---|
| 3,485,444 | 12/1969 | Linzenkirchner | 416/169 R |
| 3,824,807 | 7/1974 | Hecht | 64/6 |
| 4,066,048 | 1/1978 | Premus | 123/41.49 |
| 4,645,368 | 2/1987 | Simpson et al. | 403/9 |
| 4,692,053 | 9/1987 | Sampedro | 403/24 |
| 5,481,949 | 1/1996 | Yen | 81/438 |
| 5,647,686 | 7/1997 | Hancock et al. | 403/373 |

Primary Examiner—F. Daniel Lopez
Assistant Examiner—Ninh Nguyen
Attorney, Agent, or Firm—Brian G. Gilpin; Godfrey & Kahn, S.C.

[57] ABSTRACT

A spacing apparatus for use in mounting an engine cooling fan of a racing vehicle to a drive structure, typically the water pump drive shaft, is made from a spacer body to which a fan hub quick-releasably attaches. The spacer body has a base with a shaft extending therefrom having a reduced perimeter section over which the fan hub mounts. When the fan hub is in place, engagement rods may be inserted in the fan hub to retain the fan hub on the shaft. The engagement rods may be easily and quickly removed without risk of burn to the mechanic to allow quick release of the fan hub on which the fan blades are mounted.

16 Claims, 5 Drawing Sheets

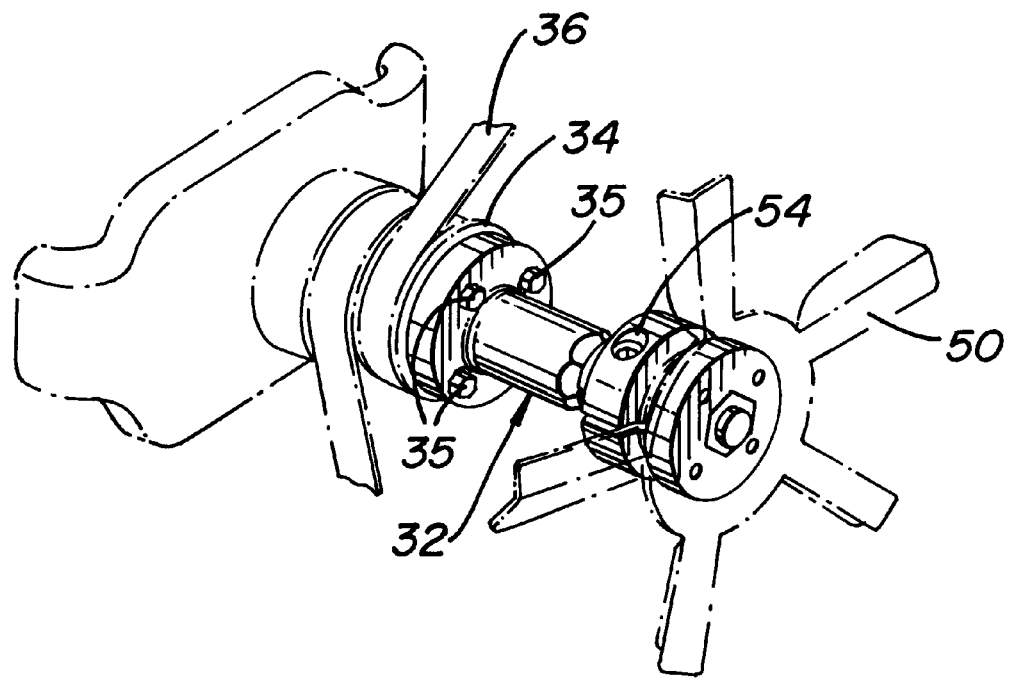
FIG_2
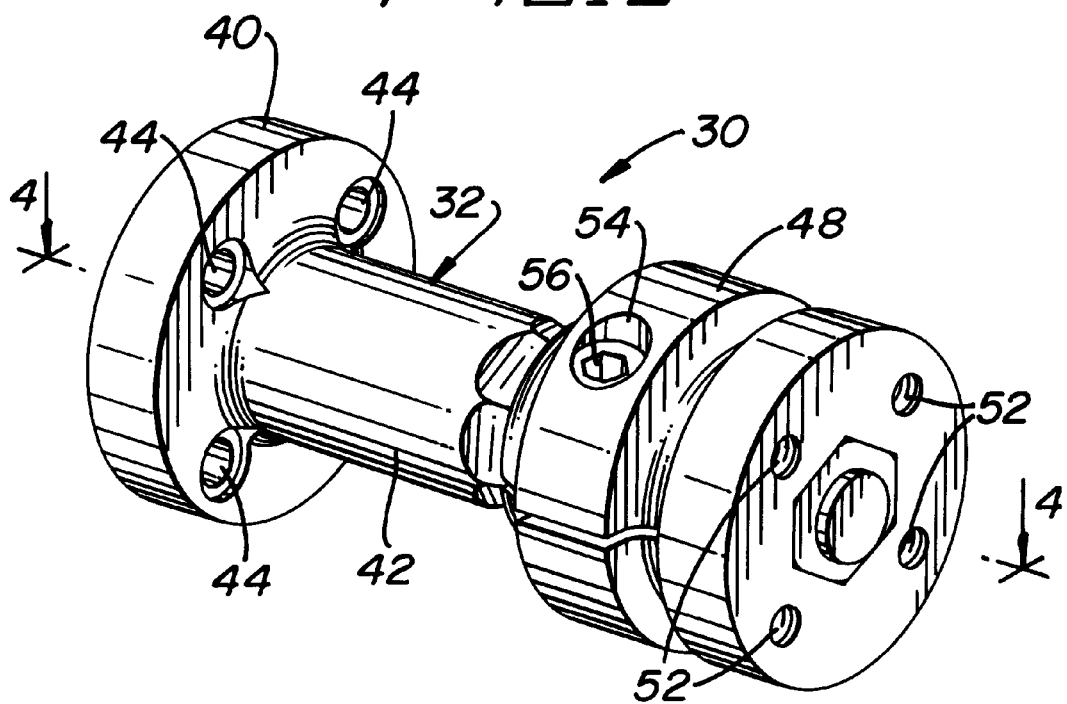
FIG_3

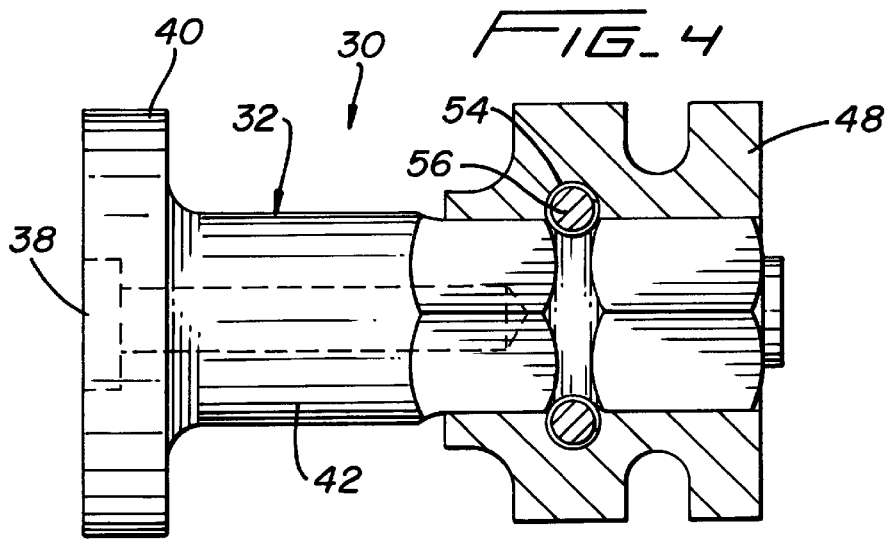
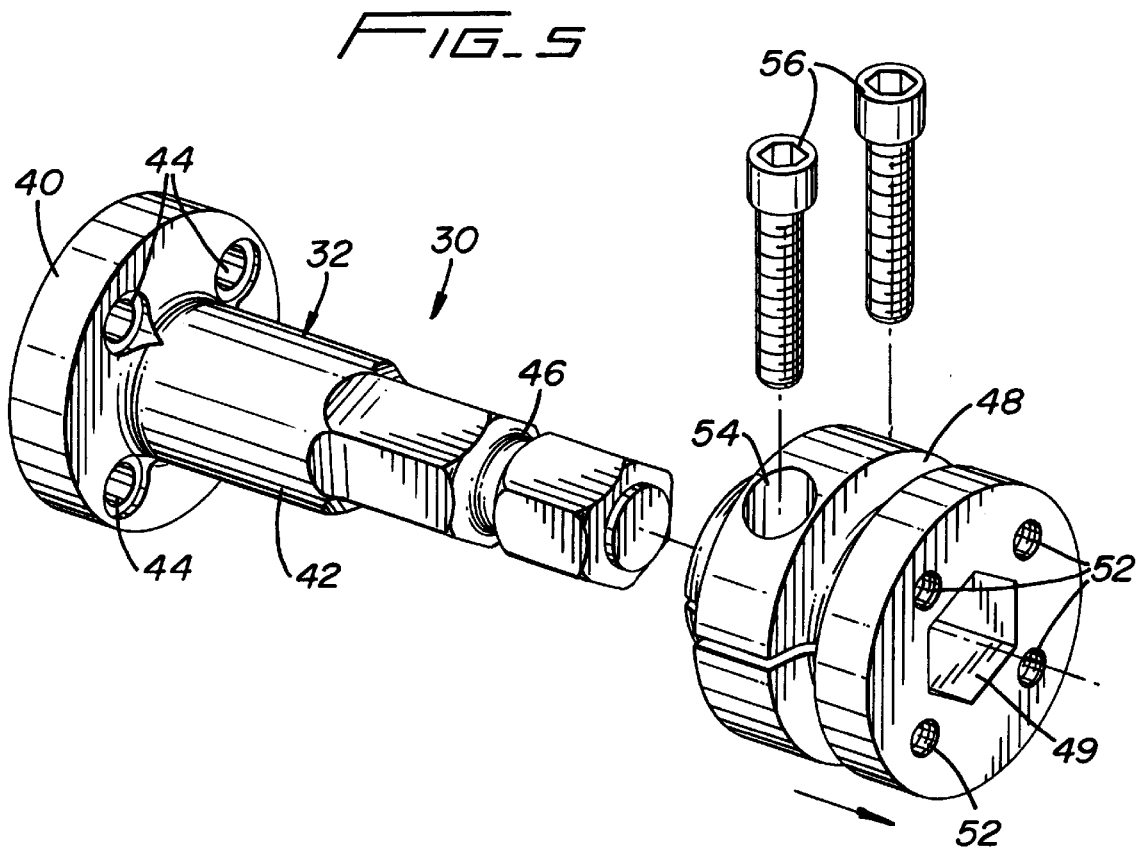

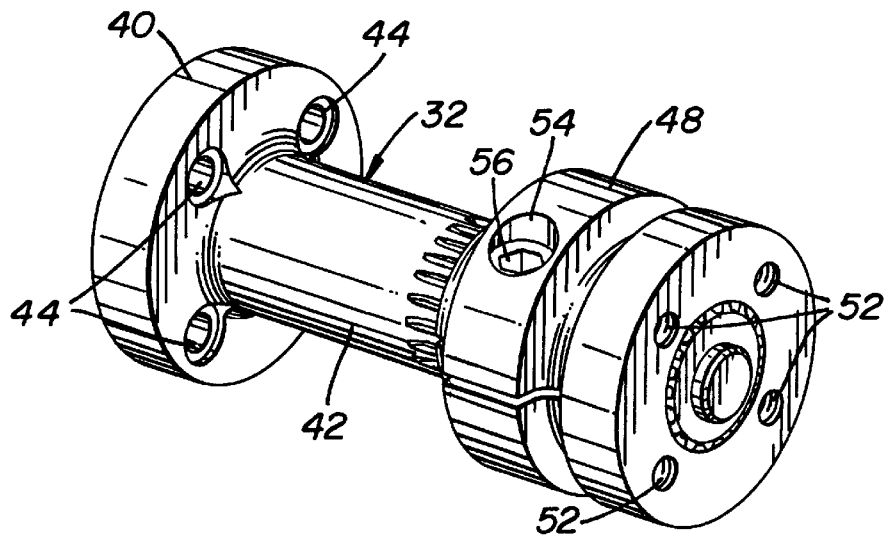
FIG_6
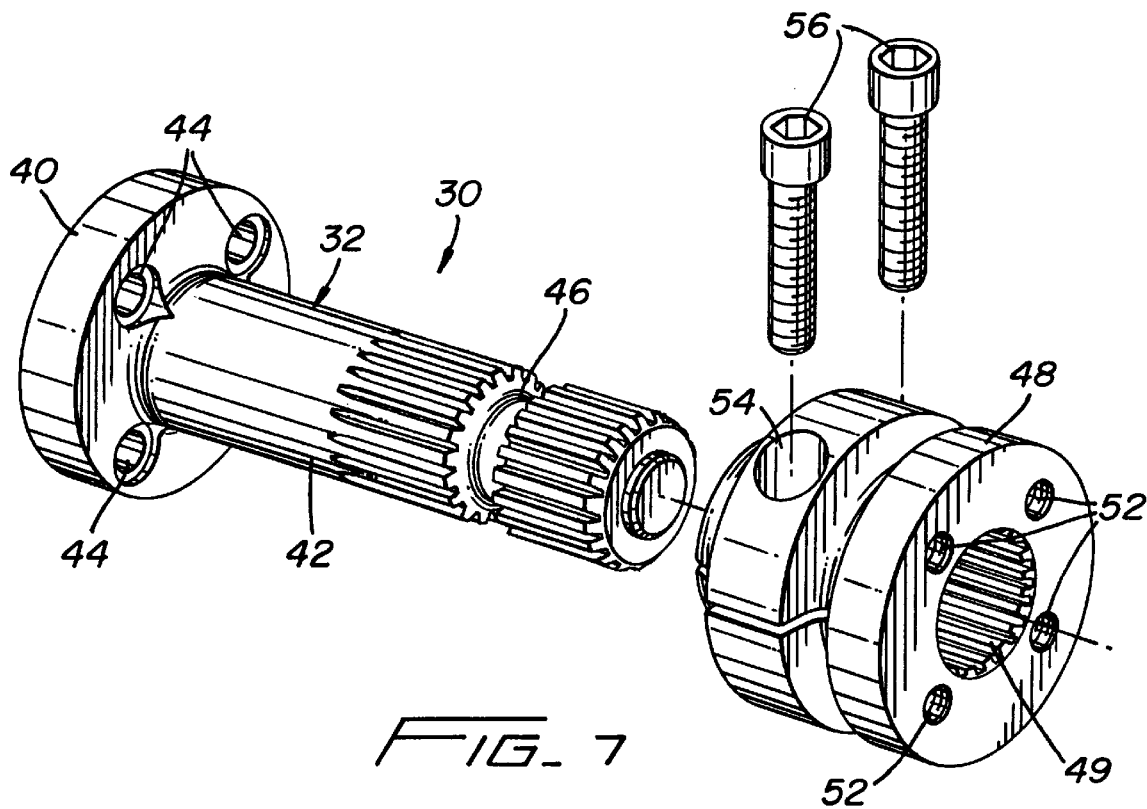
FIG_7

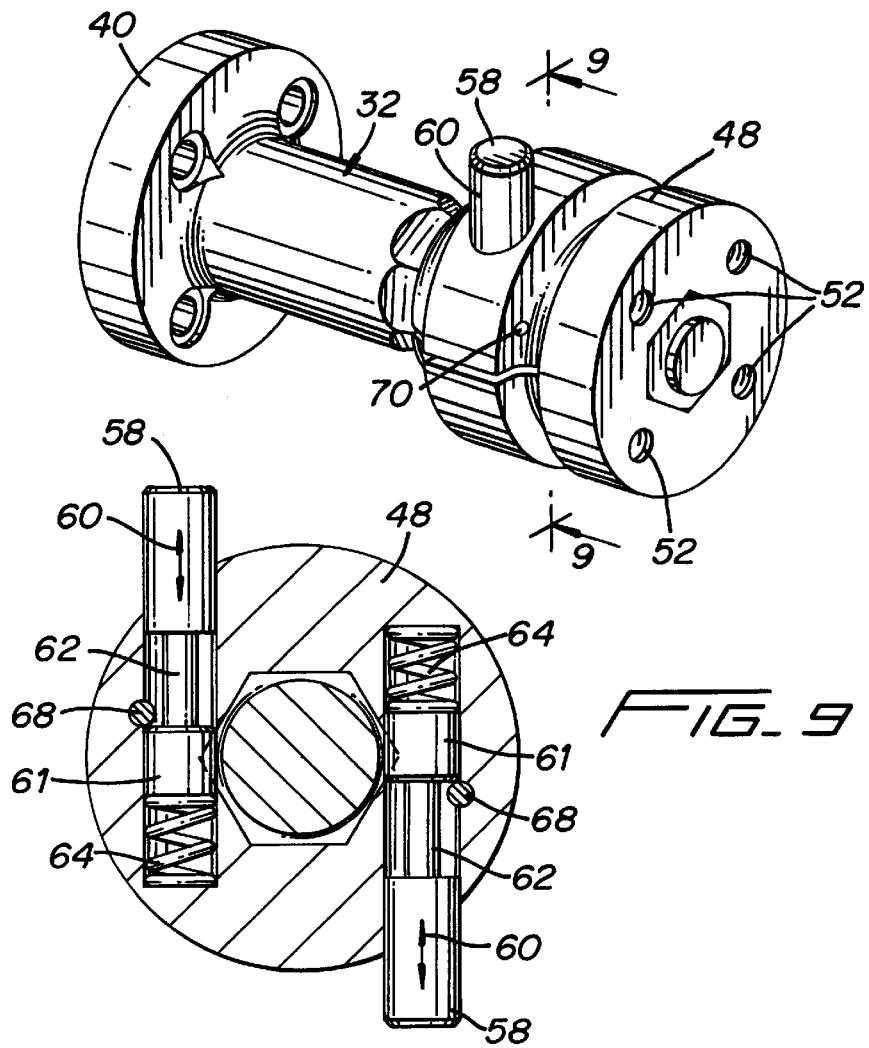
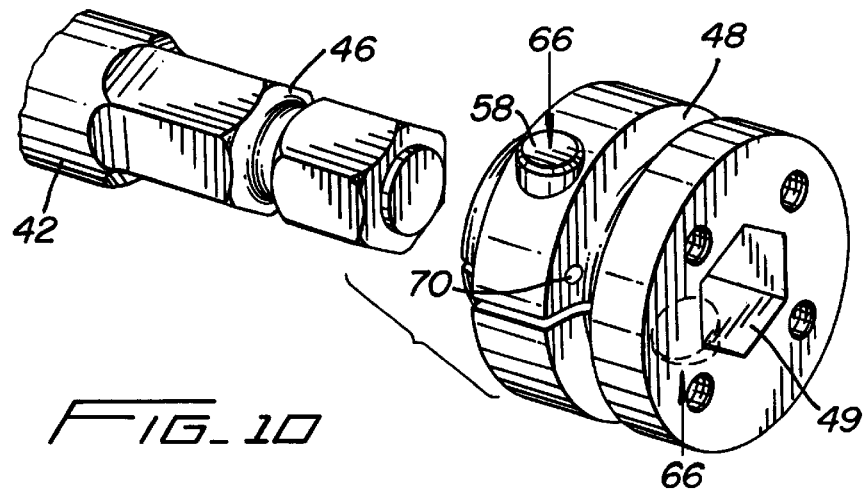

QUICK RELEASE ENGINE COOLING FAN SHAFT

FIELD OF THE INVENTION

The present invention relates generally to an engine cooling fan spacer structure and more particularly to a quick release engine cooling fan spacer structure that can quickly separate the fan structure from the water pump drive shaft.

BACKGROUND OF THE INVENTION

In conventional water-cooled internal combustion engines, the fan for circulating air through the radiator is driven by a shaft which is located behind the radiator and which usually attaches to the water pump drive shaft. The shaft itself may be driven by a belt that engages a sheave or a pulley disposed about the shaft. The fan must be located in very close proximity to the radiator in order to provide sufficient air flow through the radiator to provide the necessary cooling effect.

To this end, current fan shafts, identified generally as 20 in FIG. 1, typically mount to the water pump using four long bolts 22 that extend into the water pump assembly. The fan 25 is attached to the hub end 24 of the shaft 20 using four shorter bolts 26. When removing the fan 25, each of the four shorter bolts 26 must be removed and there is usually not much room to work between the radiator and the fan 25. Thus, removal of the fan 25 is a difficult and often time consuming task. Additionally, if the engine has been recently operated, the radiator can be extremely hot creating a serious burn risk to the person faced with the unpleasant task of removing the fan 25.

For ordinary vehicles, the inability to quickly and easily remove the fan blades from the shaft is of little consequence. However, in the automobile racing industry it is well known that if the fan blades are removed, the engine can produce as much as fifteen percent more horsepower. Such a significant horsepower increase is, of course, a very desirable effect. The problem with removing the fan blades is that they can only be removed for very short periods of running the engine or there is a dangerous probability of the engine overheating with severe damage resulting therefrom. Thus, it has become a common practice in the racing industry to remove the fan blades from the racing vehicle during time trials and to replace the fan blades for the full race.

Accordingly, there is a need for a fan spacing shaft from which the fan blades can be quickly and safely removed. Further, it would be desirable if such a fan spacing shaft were economical and could function as well as traditional fan spacing shafts.

OBJECTS AND SUMMARY OF THE INVENTION

Therefore, it is an object of the present invention to provide an engine cooling fan shaft from which the fan blades can be quickly and safely removed. It is a further object of the present invention to provide a quick release engine cooling fan shaft that is economical and can function as well as traditional fan spacing shafts.

The present invention satisfies this need by providing a fan hub that is easily separable from the fan spacing shaft. In the present invention, a fan spacing shaft is mounted to the water pump in a manner similar to conventional fan spacing shafts. The fan blades are attached to a quick release fan hub which can be removed and attached to the fan spacing shaft using two engagement rods that are oriented at a right angle to the shaft. Such an orientation of the engagement rods provides easy access for quick tightening and removal of the fan hub without the risk of burns or complicated angles that must be negotiated when removing the fan from a traditional fan spacing shaft. The engagement rods extend through the fan hub so as to engage a reduced circumference portion of the fan spacing shaft. As such, when the bolts are in place, the fan hub is substantially secured to the end of the fan spacing shaft.

One embodiment of the invention features spring-biased engagement rods. The spring-biased rods enable the mechanic to remove the fan hub even more quickly as no unscrewing of bolts is necessary.

The shape of the fan spacing shaft (and of course the corresponding interior aperture of the fan hub) may be hexagonal, round spline, or any other shape capable of transmitting the necessary rotation to the fan.

In use, the fan spacing shaft in accordance with the invention can be installed in place of a conventional fan spacing shaft. The fan blades are then attached to the quick release fan hub rather than directly to the fan spacing shaft as is conventional in the art. The quick release fan hub slides over the fan spacing shaft and the engagement rods are inserted or threaded into the fan hub such that they engage a reduced circumference portion of the fan spacing shaft. The rods are then tightened and the fan operates normally. When additional horsepower is desired, the rods can be easily unscrewed and the fan hub removed from the shaft. Of course, the vehicle cannot be operated for significant duration without the fan installed.

These are just some of the features and advantages of the present invention. Many others will become apparent by reference to the detailed description of the invention taken in combination with the accompanying drawings.

BRIEF DESCRIPTION OF THE DRAWINGS

FIG. 2 is a perspective view of a quick release fan hub shaft in accordance with the present invention with the water pump and fan blades shown in phantom;

FIG. 3 is a perspective view of a quick release fan hub shaft in accordance with the present invention;

FIG. 4 is a partial cross-sectional view of the quick release fan hub shaft of FIG. 3 taken generally along the line 4—4, wherein the fan hub and engagement rods are shown in cross-section;

FIG. 5 is an exploded perspective view of the quick release fan hub shaft of FIG. 2;

FIG. 6 is a perspective view of another embodiment of a quick release fan hub shaft in accordance with the present invention;

FIG. 7 is an exploded perspective view of the quick release fan hub shaft shown in FIG. 6;

FIG. 8 is a perspective view of another embodiment of a quick release fan hub shaft in accordance with the present invention;

FIG. 9 is a partial cross-sectional view of the quick release fan hub shaft shown in FIG. 8 taken generally along the line 9—9; and FIG. 10 is an exploded detail view of the embodiment of a quick release fan hub shaft shown in FIG. 8.

DETAILED DESCRIPTION

Figure 1:
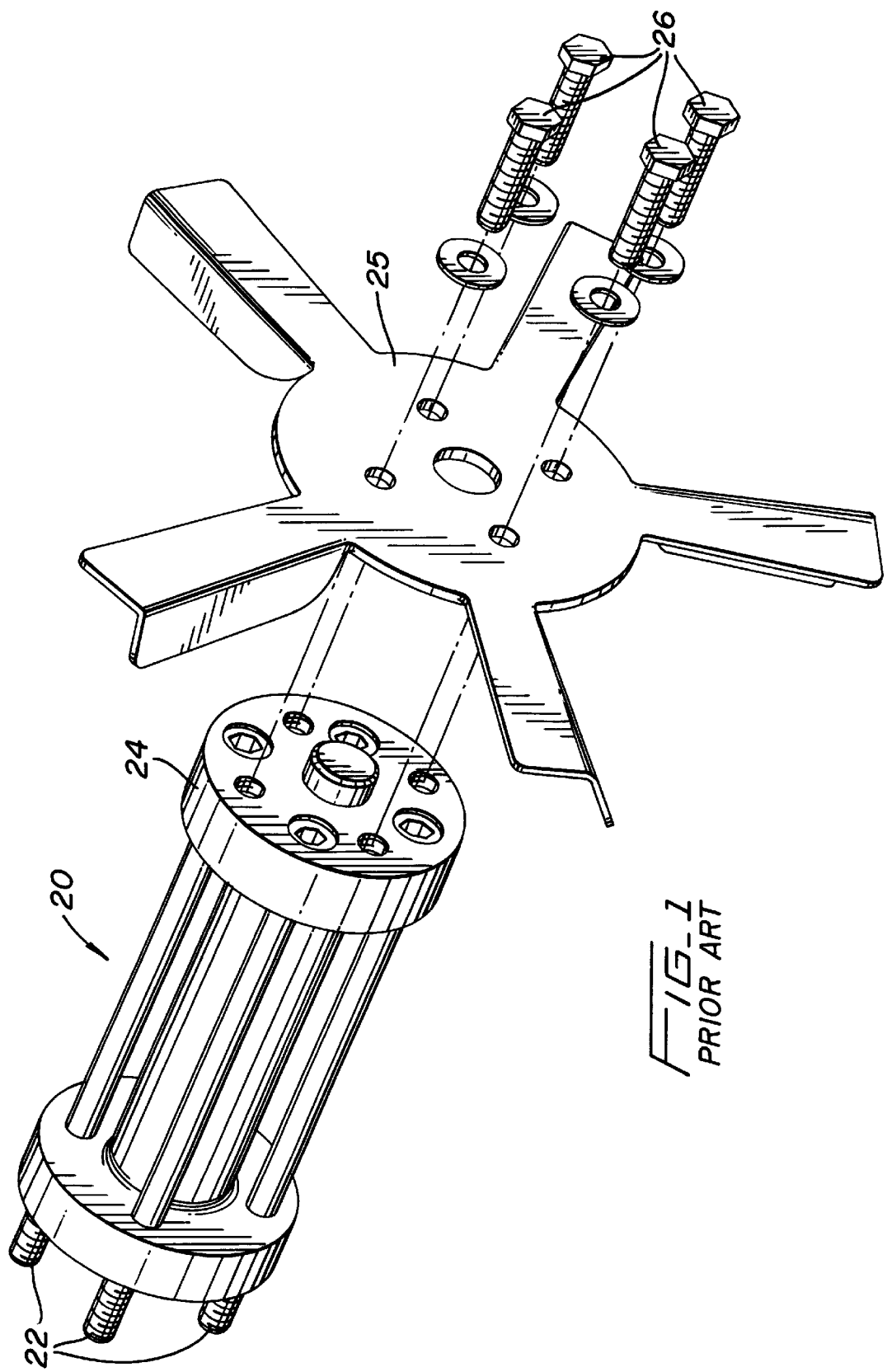
FIG. 1 is a partially exploded perspective view of a prior art fan hub shaft.

As illustrated generally in FIG. 2, the quick release engine cooling fan spacer structure (identified generally as 30) in accordance with the invention satisfies the shortcomings of existing fan shafts 20 when used in racing vehicles. The spacer structure 30 has a spacer body 32 that removably attaches using bolts 35 or other attachment means to the water pump shaft 34. The water pump shaft 34 is typically driven by a belt 36 or pulley disposed about the pump shaft. Rotation of the pump shaft 34 thereby causes rotation of the spacer body 32. The spacer body 32 may mount to the pump shaft 34 over a spindle extension 38 (shown in phantom in the partial cross-section of FIG. 4) that extends from the pump shaft 34.

Referring now to FIGS. 3, 4, and 5, the spacer body 32 is formed by a mounting section 40 or base having a shaft section 42 or post extending therefrom. The shaft section 42 may be hexagonally-shaped or may have another shape suitable to place a fan hub 48 in rotation transmission relation to the shaft section 42. As best shown in FIG. 5, the shaft section 42 has a reduced perimeter section 46 over which the fan hub 48 can be disposed. The mounting section 40 has bolt holes 44 through which the spacer body 32 is bolted to the pump shaft 34. Of course, the mounting section 40 may be otherwise placed in rotation transmission relation to the pump shaft 34. The fan hub 48 has an aperture 49 that is disposed about the shaft section 42. The aperture 49 is formed to match the shape of the shaft section 42 such that the fan hub 48 is in rotation transmission relation with the shaft section 42 when it is positioned thereon.

The shape of the fan hub 48 is not of critical importance so long as provision is made for attaching the fan 50 (shown in phantom in FIG. 2) to the fan hub 48. One means for accomplishing this objective is to provide a number of threaded bolt holes 52 into which bolts extending through the fan 50 may be secured. Of course, the fan 50 may be otherwise attached to the fan hub 48 and the fan 50 and fan hub 48 may be formed as an integral unit. The fan hub 48 has a number of engagement rod bores 54 in which engagement rods 56 may be secured.

As best seen in FIG. 4, the engagement rod bores 54 are positioned within the fan hub 48 such that when the engagement rods 56 are extended therethrough, the rods 56 engage the reduced perimeter section 46 of the shaft section 42. This interface between the engagement rods 56 and the reduced perimeter section 46 of the shaft section 42 prevents the fan hub 48 from being removed from the shaft section 42 until the engagement rods 56 are removed from the engagement rod bores 54. The engagement rod bores 54 are disposed within the fan hub 48 such that the engagement rods 56 may be easily removed from and installed in the fan hub 48 without subjecting the mechanic to risk of burn from a hot radiator. As such, an orientation of the engagement rod bores 54 substantially perpendicular to the shaft section 42 is preferred. The engagement rods 56 may be threaded bolts that are threaded into threaded engagement rod bores 54.

In one alternative embodiment, shown in FIGS. 6 and 7, the shaft section 42 and the corresponding aperture 49 in the fan hub 48 are spline-shaped. As noted above, the shape of the shaft section 42 may be a wide variety of shapes to place the fan hub 48 in rotation transmission relation to the shaft section 42. The engagement rods 56 may be disposed within the fan hub 48 through engagement rod bores 54 as described above. While the hexagonal and spline shapes have been shown to be effective, it has been found that particular shapes of shaft section 42 and aperture 49 may be preferable in certain applications of the present invention. It is within the ability of one skilled in the art to select a shape for the particular application.

In another alternative embodiment, shown in FIGS. 8, 9, and 10, the engagement rods 56 are spring biased rods 58 each having a first end portion 60, a second end portion 61, and a middle portion 62 with a reduced perimeter. A spring 64 within the fan hub 48 biases the rods 58 such that the second end portion 61 engages the reduced perimeter section 46 of the shaft section 42. Similarly, when the engagement rod 56 is forced against the bias of the spring 64, the middle portion 62 with the reduced perimeter is disposed over the reduced perimeter section 46 of the shaft section 42. In assembling a fan hub 48 in accordance with this embodiment, the spring 64 is first inserted in the engagement rod bore 54. Then, the spring biased rod 58 is inserted into the engagement rod bore 54, second end portion 61 first. The first end portion 60 is then pressed in the direction indicated by arrow 66 in FIG. 10 and a pin 68 is inserted in pin hole 70 such that the pin extends across the middle portion 61 of the engagement rod 56 with the reduced perimeter. The pin 68 is located along the engagement rod bore 54 such that when the spring 64 is compressed by pressing the first end portion 60 (arrow 66), the first end portion 60 hits the pin 68 to stop the motion of the engagement rod 56. Similarly, when the first end portion 60 is released and the spring 64 biases the engagement rod 56, the motion of the engagement rod 56 is stopped by the pin 68 such that the second end portion 61 engages the reduced perimeter section 46 of the shaft section 42 and prevents removal of the fan hub 48. Removal and installation of the fan hub 48 in accordance with this embodiment is achieved very quickly and safely.

In installing the quick release engine cooling fan spacer structure 30 in accordance with the invention, the mechanic first removes the existing fan spacer 20. Then, the mechanic places the spacer body 32 over the spindle section 38 (if included in the pump shaft 34 structure) and bolts the spacer body 32 to the water pump shaft 34 through the mounting section 40. Next, the fan 50 is mounted to the fan hub 48 if the two pieces are not formed as an integral body. The fan hub 48 is then placed over the shaft section 42 such that the engagement rod bores 54 are positioned transverse to the reduced perimeter section 46 of the shaft section 42. Finally, the engagement rods 56 are inserted or threaded into the engagement rod shafts such that the fan hub 48 is prevented from being removed from the shaft section 42. Installation is then complete and the vehicle prepared to go off to the races. Removal of the fan hub 48 for time trials or as otherwise desired is accomplished by simply removing the engagement rods 56 from the engagement rod bores 54 and the fan hub 48 is removed from the shaft section 42. Installation and removal of the embodiment shown in FIGS. 8, 9, and 10 is similarly accomplished with the first end portion 60 being depressed and released as necessary to effectuate engagement and disengagement of the engagement rods 56 from the reduced perimeter section 46 of the shaft section 42.

As illustrated by the foregoing description and shown in the Figures, the present invention is more suitable as a cooling fan spacing shaft for use in racing vehicles than are existing devices. The present invention overcomes the limitations and disadvantages of existing devices by utilizing an effective design of a cooling fan spacing shaft that enables the fan to be quickly removed and installed without the risk of injury or performance degradation.

Although the invention has been herein shown and described in what is perceived to be the most practical and preferred embodiments, it is to be understood that the invention is not intended to be limited to those specific embodiments. Rather, it is recognized that modifications may be made by one of skill in the art without departing from the spirit or intent of the invention. Therefore, the invention is to be taken as including all reasonable equivalents to the subject matter of the appended claims.

What is claimed is:

1. A cooling fan spacer structure comprising:
   a spacer body formed by a mounting section having a shaft section extending therefrom, the shaft section having a reduced perimeter segment; and
   a fan hub disposed about the shaft section, the fan hub having at least one engagement rod disposed therethrough so as to be capable of selectively engaging the reduced perimeter segment of the shaft section.

2. The cooling fan spacer structure of claim 1 wherein the at least one engagement rod comprises two engagement rods disposed within the fan hub such that they are substantially perpendicular to and transversely engage the reduced perimeter section of the shaft section of the spacer body.

3. The cooling fan spacer structure of claim 2 wherein the engagement rods are threaded bolts.

4. The cooling fan spacer structure of claim 2 wherein the engagement rods are spring biased rods each having first and second end portions and a middle portion with a reduced diameter, the engagement rods biased such that the second end portion engages the reduced perimeter segment of the shaft section.

5. The cooling fan spacer structure of claim 4 wherein the bias of the spring biased rods is capable of being overcome using hand pressure, the middle portion of the spring biased rods being disposed to disengage the engagement rods from the shaft section as a result of overcoming the spring bias.

6. The cooling fan spacer structure of claim 4 wherein the shaft section has hexagonal-shaped cross-section.

7. The cooling fan spacer structure of claim 4 wherein the shaft section has a spline-shaped cross-section.

8. The cooling fan spacer structure of claim 3 wherein the shaft section has hexagonal-shaped cross-section.

9. The cooling fan spacer structure of claim 3 wherein the shaft section has a spline-shaped cross-section.

10. A spacing apparatus for use in mounting an engine cooling fan to a drive structure, the spacing apparatus comprising:
    a spacer body having a base, the base in rotary force transmission relationship with the drive structure and having a post extending therefrom, the post having a reduced perimeter portion;
    a hub to which said fan is secured, said hub having a bore therethrough such that the hub is capable of being releasably mounted on the spacer body; and
    at least one engagement rod extending at least partially through the hub and athwart the reduced perimeter portion of the post, the at least one engagement rod capable of being removed from athwart the reduced perimeter portion of the post, thereby allowing release of the hub from the spacer body by movement of the hub substantially axially to the post.

11. The spacing apparatus of claim 10 wherein the at least one engagement rod comprises two engagement rods extending at least partially through the hub and athwart the reduced perimeter portion of the post.

12. The spacing apparatus of claim 11 wherein the engagement rods are threaded bolts.

13. The spacing apparatus of claim 11 wherein the engagement rods are spring biased rods each having first and second end portions and a middle portion with a reduced perimeter.

14. A spacing apparatus for use in mounting an engine cooling fan to a drive structure, said spacing apparatus comprising:
    a spacer body having a base portion, the base portion in rotary force transmission relationship with the drive structure, the base portion having a post portion extending therefrom; and
    a hub to which said fan is secured, said hub having a bore therethrough and moveable engagement means such that the hub is capable of being quick-releasably mounted in rotary force transmission relationship with the spacer body.

15. The spacing apparatus of claim 12 wherein the hub is quick-releasably mounted in rotary force transmission relationship with the spacer body by threading bolts through the hub such that they engage a reduced perimeter portion of the post.

16. The spacing apparatus of claim 12 further comprising spring biased rods disposed within the hub, the spring biased rods capable of selectively engaging a reduced perimeter portion of the post.

* * * * *